(12) United States Patent
Klingner et al.

(10) Patent No.: US 12,241,747 B2
(45) Date of Patent: Mar. 4, 2025

(54) WORLDWIDE COORDINATE FRAME DEFINED BY DATA SET CORRESPONDENCES

(71) Applicant: Google LLC, Mountain View, CA (US)

(72) Inventors: Bryan Klingner, Austin, TX (US); David Martin, Oakland, CA (US); Veselin Dikov, San Jose, CA (US); Joakim Kristian Olle Arfvidsson, Los Altos, CA (US); James Brian Roseborough, Piedmont, CA (US)

(73) Assignee: GOOGLE LLC, Mountain View, CA (US)

( * ) Notice: Subject to any disclaimer, the term of this patent is extended or adjusted under 35 U.S.C. 154(b) by 539 days.

(21) Appl. No.: 17/621,866

(22) PCT Filed: Jun. 26, 2019

(86) PCT No.: PCT/US2019/039278
§ 371 (c)(1),
(2) Date: Dec. 22, 2021

(87) PCT Pub. No.: WO2020/263248
PCT Pub. Date: Dec. 30, 2020

(65) Prior Publication Data
US 2022/0244056 A1  Aug. 4, 2022

(51) Int. Cl.
*G01C 21/32* (2006.01)
*G06T 7/33* (2017.01)
*G06V 10/80* (2022.01)

(52) U.S. Cl.
CPC ............... *G01C 21/32* (2013.01); *G06T 7/33* (2017.01); *G06V 10/803* (2022.01); *G06T 2207/10032* (2013.01)

(58) Field of Classification Search
CPC . G01C 21/32; G06T 7/33; G06T 2207/10032; G06V 10/803
See application file for complete search history.

(56) References Cited

U.S. PATENT DOCUMENTS 8,665,266 B2   3/2014  Vandrovec
8,761,457 B1 *  6/2014  Seitz .................... G06T 3/14
                                                       382/113

(Continued)

FOREIGN PATENT DOCUMENTS

| CA | 3075119 | 3/2019 |
| CN | 108710140 | 10/2018 |

(Continued)

OTHER PUBLICATIONS

International Preliminary Report on Patentability for Application No. PCT/US2019/039278, mailed Jan. 6, 2022, 6 pages.

(Continued)

*Primary Examiner* — Luis A Martinez Borrero
(74) *Attorney, Agent, or Firm* — DORITY & MANNING P.A.

(57) ABSTRACT

The present disclosure is directed to methods and systems for generating a geodetic datum. The geodetic datum can establish a coordinate system and/or a set of reference points that describe the respective locations of a portion or all of Earth and/or objects located thereon. In general, a computing system can generate the geodetic datum using various sensor data from one or more sources including: satellite imagery, aerial imagery, aerial light detection and ranging data (LIDAR), ground-level imagery, ground-level LIDAR, and/or other forms of sensor data. This data can be used as a reference dataset that can be combined with additional sensor data (e.g., a second dataset) to determine correspondences between overlapping areas represented in the datasets. Continuing this process for regions that collectively (Continued)

cover the Earth can be used to create a geodetic datum of the entire Earth, without using a mathematic abstraction of the Earth surface.

20 Claims, 6 Drawing Sheets

(56) References Cited

U.S. PATENT DOCUMENTS

| | | | |
|---|---|---|---|
| 8,848,983 B1* | 9/2014 | Brewington | G06T 17/05 382/109 |
| 8,874,375 B2* | 10/2014 | Yeh | G01C 21/20 701/533 |
| 8,958,980 B2 | 2/2015 | Miksa et al. | |
| 9,104,695 B1* | 8/2015 | Cervelli | G06F 16/50 |
| 9,142,021 B1* | 9/2015 | Seitz | G06T 3/14 |
| 9,437,034 B1* | 9/2016 | Wei | G06T 17/00 |
| 9,483,497 B1* | 11/2016 | Kornmann | G06F 3/0482 |
| 10,198,632 B2 | 2/2019 | Sasaki et al. | |
| 11,140,510 B2* | 10/2021 | Bailiang | G01C 21/3638 |
| 11,201,981 B1* | 12/2021 | Suiter | G06Q 30/0639 |
| 11,860,212 B1* | 1/2024 | Anderson | G01R 31/086 |
| 11,979,547 B2 | 5/2024 | Millett | |
| 2009/0154793 A1 | 6/2009 | Shin et al. | |
| 2009/0232415 A1 | 9/2009 | Uyttendaele et al. | |
| 2010/0088164 A1* | 4/2010 | Nielsen | G06Q 10/06395 705/7.41 |
| 2010/0189312 A1* | 7/2010 | Nielsen | G09B 29/10 382/113 |
| 2010/0299370 A1 | 11/2010 | Otto | |
| 2012/0089333 A1* | 4/2012 | Yeh | G09B 29/005 702/5 |
| 2014/0015858 A1* | 1/2014 | Chiu | G09G 5/14 345/633 |
| 2014/0023996 A1* | 1/2014 | Finn | B29C 64/112 427/258 |
| 2014/0071234 A1* | 3/2014 | Millett | H04N 13/271 348/43 |
| 2015/0073711 A1* | 3/2015 | Brewington | G01C 21/3644 702/5 |
| 2015/0128089 A1* | 5/2015 | Johnson | G06F 16/29 715/800 |
| 2016/0203624 A1* | 7/2016 | Anderson | G06T 15/00 345/419 |
| 2017/0004345 A1 | 1/2017 | Sasaki et al. | |
| 2017/0228926 A1* | 8/2017 | Golovinskiy | G06T 15/20 |
| 2018/0025538 A1* | 1/2018 | Jones | G06T 17/05 345/420 |
| 2018/0283882 A1* | 10/2018 | He | H04L 67/30 |
| 2018/0292541 A1* | 10/2018 | De Silva | G01S 17/06 |
| 2020/0003906 A1* | 1/2020 | Mehta | G01C 21/206 |
| 2020/0080848 A1* | 3/2020 | Sprague | G01C 21/206 |
| 2020/0292327 A1* | 9/2020 | Rabel | G06V 20/582 |
| 2021/0041259 A1* | 2/2021 | Filip | G06T 7/70 |
| 2022/0224781 A1* | 7/2022 | Sennersten | G06T 17/05 |
| 2022/0244056 A1* | 8/2022 | Klingner | G01C 21/32 |

FOREIGN PATENT DOCUMENTS

| | | |
|---|---|---|
| CN | 109612447 | 4/2019 |
| KR | 20150020421 | 2/2015 |

OTHER PUBLICATIONS

International Search Report and Written Opinion for Application No. PCT/US2019/039278, mailed Apr. 20, 2020, 8 pages.

Machine Translated Chinese Search Report Corresponding to Application No. 201980099077X on Mar. 4, 2024.

Chinese Search Report Corresponding to Application No. 201980099077X on Jul. 12, 2024.

* cited by examiner

WORLDWIDE COORDINATE FRAME DEFINED BY DATA SET CORRESPONDENCES

PRIORITY CLAIM

This application is based upon and claims the right of priority under 35 U.S.C. § 371 to International Application No. PCT/US2019/039278 filed on Jun. 26, 2019. Applicant claims priority to and the benefit of each of such applications and incorporates all such applications herein by reference in their entirety.

FIELD

The present disclosure relates generally to geodetic datums. More particularly, the present disclosure relates to computing systems and methods for generating a geodetic datum.

BACKGROUND

A geodetic datum is a reference system used to define coordinate points along the Earth's surface. In general, these systems define a geometric approximation of the Earth (e.g., an ellipsoid, a combination of spherical representations or harmonics, etc.) Coordinate points can then be projected onto the geometric approximation to provide the reference system.

Changes in the location of continents (e.g., from continental drift, increases in sea level, etc.), buildings (e.g., from construction), or other features of Earth on which the coordinate points are projected can lead to challenges for mapping and navigation applications since current systems utilize a mathematical abstraction that is unbound to features of the Earth itself. Broadly adopted worldwide coordinate systems (datums) already exist, for example the World Geodetic System (WGS) or earth-centered, earth-fixed (ECEF). However, these existing datums can have drawbacks, especially in certain locations such as cities, since they are developed independent of time-varying features on the surface of the Earth. For instance, when a continent moves, the buildings on it shift with it changing their coordinates in existing datums such as WGS84.

Needed in the art are methods for producing a geodetic datum that utilize physical features of the Earth and can be updated readily. While anchor locations have been used previously in some geodetic datums, their use has done little to improve relative location accuracy which can be important for navigating some locations. Additionally, anchor locations may be difficult to update without completely changing the datum. Disclosed herein are methods and systems for generating a geodetic datum that utilize data-driven representations which can be updated and referenced over time.

SUMMARY

Aspects and advantages of embodiments of the present disclosure will be set forth in part in the following description, or can be learned from the description, or can be learned through practice of the embodiments.

One example aspect of the present disclosure is directed to methods for generating a geodetic datum. Each of these methods can include executing the following actions using one or more computing devices: obtaining a set of datum coordinates derived from a reference dataset comprising geographic data corresponding to a first part of the portion of Earth, obtaining a second dataset containing sensor data corresponding to a second part of the portion of Earth, the second part of the portion of the Earth at least partially overlapping with the first part of the portion of Earth, determining a set of correspondences between the reference dataset and the second dataset, determining a set of transform coordinates for the second dataset based at least in part on the set of correspondences, and
updating the set of datum coordinates to include the set of transform coordinates.

Another example aspect is directed to applications that utilize location or position information. Geodetic datums generated using the methods and systems disclosed herein can be used to provide higher relative accuracy that may improve location information for applications such as augmented reality, navigation, and driverless automobiles. Aspects of the present disclosure are also related to methods for accessing data from a geodetic datum generated according to embodiments of the disclosure.

Other aspects of the present disclosure are directed to various systems, apparatuses, non-transitory computer-readable media, user interfaces, and electronic devices which implement techniques disclosed herein or that can be derived through practice of the disclosure.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
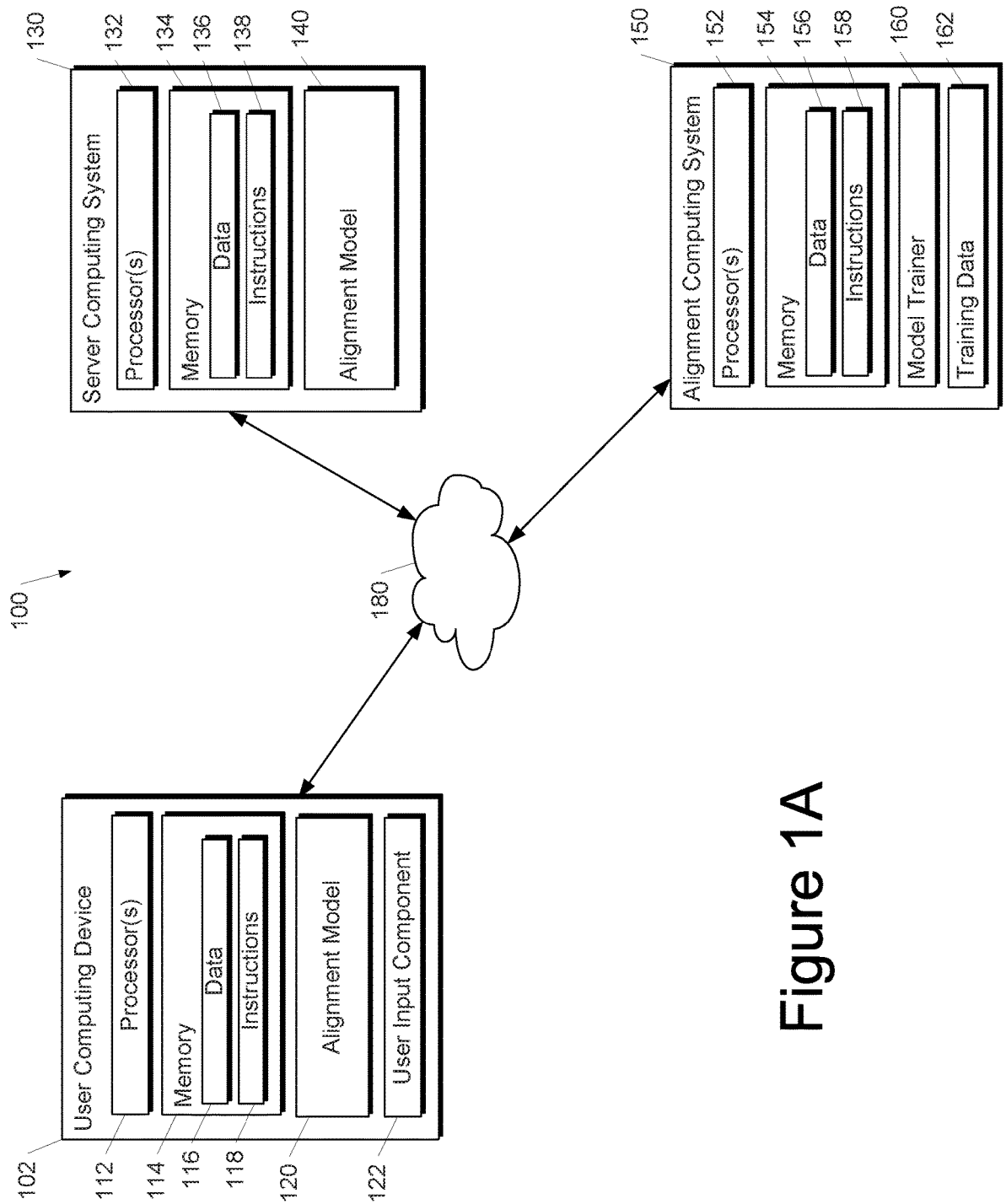
FIG. 1A depicts a block diagram of an example computing system for generating a geodetic datum according to example embodiments of the present disclosure.

Reference numerals that are repeated across plural figures are intended to identify the same features in various implementations.

DETAILED DESCRIPTION

Overview

Generally, the present disclosure is directed to methods and systems for generating a geodetic datum for a portion of the Earth. The geodetic datum can establish a coordinate system and/or a set of reference points that describe the respective locations of a portion or all of the Earth and/or objects located thereon. In general, a computing system can generate the geodetic datum using a variety of sensor data from one or more sources, such as, for example, satellite imagery, aerial imagery, aerial light detection and ranging data (LIDAR), ground-level imagery, ground-level LIDAR, and/or other forms of sensor data. In particular, the computing system can identify a set of correspondences between two or more representations (e.g., three-dimensional models) of sensor data collected from two or more different data sources. In some instances, a first set of data can be treated as a reference set with established locations and a second set of data can be transformed and aligned relative to the reference set to enable fusion of the data sets. Example correspondences can include image features (e.g., color, shape, edges, depicted objects, etc.), structural or spatial features (e.g., spatial features captured within a point cloud, shapes, edges, etc.), and/or other features. The computing system can use the identified set of correspondences to align the sets of sensor data to generate a consistent geodetic datum that has high relative accuracy, for example as opposed to exact geolocation accuracy. Stated differently, by aligning sensor data from multiple sources, relative accuracy for the positions of objects on the Earth can be improved compared to standard coordinate systems. For example, the World Geodetic System (WGS) relies on an abstraction which assumes the shape of the Earth. In contrast, the methods and systems disclosed herein utilize sensor information to create data-driven representations that can be updated periodically upon receiving new or improved sensor data. Additionally, these methods can be used to generate a datum that is anchored to observable places or features instead of floating above the Earth as a detached mathematic abstraction.

Thus, the geodetic datum(s) produced through the joint alignment techniques described herein can provide good alignment among data sets when they are combined. In particular, the proposed techniques do not focus exclusively on true geographic accuracy or assume an ellipsoidal model of the Earth, but instead generate geodetic datums(s) that can exhibit strong internal consistency and relative accuracy/position. Consistency among datasets and relative accuracy within them is often more important than absolute accuracy of geolocation in practice. Absolute geographic position is only routinely measured with GPS, which degrades badly in urban areas. Thus, for many applications, absolute position is less important than ensuring that all geographic data presented to a user is mutually consistent: that is, that corresponding objects (e.g., roads, buildings, landmarks) are co-located in all datasets visible in a single product. As one example, even if a localization generated based on the geodetic datum for performing augmented reality is off by several meters, the user experience is not degraded so long as the user location as well as any annotations, building facades, and/or other virtual elements are also off by the same several meters. As long as relative accuracy is high, all geographic representations should be consistent for the user, which provides a good user experience.

More particularly, an example aspect of the present disclosure includes a method for generating a geodetic datum. In general, the method includes obtaining or otherwise receiving a reference dataset that includes a variety geographic data that can include sensor information from a GPS device, an accelerometer, a camera, RADAR, LIDAR, or other data capture devices. The reference dataset can optionally also be associated with an existing set of datum coordinates (e.g., WGS coordinates) that can be used as an initial reference frame for generating the geodetic datum. To grow the initial reference frame, additional sensor data can be obtained (e.g., from satellite, aerial, and/or ground-level imagery.) The additional sensor data can be used to create a second dataset that can be aligned with the reference dataset by identifying overlapping regions (e.g., using image alignment or other forms of feature matching to identify correspondences). By aligning the second dataset with the reference dataset, a set of correspondences can be identified which can be used to assign datum coordinates to the second dataset, thereby fusing the second dataset with the reference dataset.

Another example aspect of the disclosure includes determining a set of transform coordinates for the second dataset based at least in part on the set of correspondences. In certain implementations, determining the set of transform coordinates can include calculating a transform field based in part on the set of correspondences, and applying the transform field to at least a portion of the second dataset. Generally, the set of transform coordinates can include coordinates for each data point included in the second dataset or some of the datapoints included in the second dataset (e.g., each data point included in the portion of the second dataset or some of the datapoints included in the portion of the second dataset.)

As an example for illustration, image data can be gathered by one or more aircraft and/or satellites to form an initial reference dataset. The image data can be associated with GPS coordinates (e.g., latitude and longitude) that can be used to assign the initial set of datum coordinates to the image data. To expand the datum coordinates. Additional sensor data can be acquired from an existing dataset (e.g., street images) or from a new dataset (e.g., additional satellite imagery). In general, the additional sensor data should have some correspondence or overlap with the reference dataset (that is, depict or represent at least some of the same portion(s) of the Earth). Using an alignment model (e.g., image comparison, feature mapping, etc.) areas of overlap between the reference dataset and the additional sensor data can be identified. Spatially mapping these sets of correspondences can be used to determine a transform field that can create a continuous representation of the image space in both datasets. Real-world datum coordinates can be generated for the second dataset by applying the transform field to at least a portion of the second dataset. In an example implementation, the transform field can include a matrix operation that can take a spatial representation as may be generated by the set of correspondences and extrapolate coordinate points (e.g., latitude, longitude, and altitude) using some or a portion of the set of datum coordinates.

In general, obtaining the reference dataset can be accomplished by receiving transmitted data (e.g., from a camera), accessing saved data, or both. The reference dataset can include a variety of different data including time, image, and spatial that may be independent or associated with one another. For example, a drone may be used to capture video and/or still images of an area over Los Angeles at varying altitudes. This initial data can provide the basis for the datum since the longitude, latitude, and altitude are known for each video and image taken.

Assigning a set of datum coordinates to the reference dataset can include accessing the longitude, latitude, and altitude information included as part of the reference dataset. Alternatively or additionally, a new basis or reference point may be adopted for use as the datum coordinates by mapping the course of the drone (e.g., speed, direction, etc.) and assigning each point in the course datum coordinates. For example, multi-view stereo and/or bundle adjustment techniques can be performed to determine a three-dimensional model that provides latitude, longitude, and/or altitude coordinates for each point, with some degree of internal error. Thus, the datum coordinates can include spatial coordinates such as longitude, latitude, and altitude and/or can be expressed relative to other datum coordinates. Aspects of this disclosure can also include the ability to reference the geodetic datums to time. Thus datum coordinates may include temporal information as well which can provide advantages for use in spaces that can change rapidly such as cities.

Similar to obtaining the reference dataset, a second dataset can be obtained using a variety of methods and need not be limited to using the same sensor modality as used to obtain the reference dataset. For example, the reference dataset can include aerial imagery, while the second dataset includes images taken on the ground. As another example, the reference dataset can include color images, while the second dataset includes images in black and while. As a further example, the reference dataset can include location (e.g., GPS) information, while the second dataset only includes image data. Many other differences can exist in modality, data collection apparatus, and/or other data characteristics/attributes. Alternatively, the second dataset can be highly similar or identical in modality to the reference dataset.

Another aspect of the disclosure includes determining a set of correspondences between the reference dataset and the second dataset. Ideally, the set of correspondences should identify areas or points of overlap or correspondence between the reference dataset and the second dataset. Since the Earth is a continuous space, these areas of overlap can be used to determine spatial information such as distance that can be used to translate spatial information from one dataset (e.g., the reference dataset) to the second dataset.

As one example implementation, correspondences can be identified using various image feature matching techniques, iterative closest point algorithms, and/or the like. In some implementations, correspondences can be identified between the raw sensor data. In other implementations, various pre-processing techniques such as bird's eye view representations, three-dimensional modeling (e.g., mesh models), and/or the like can be used to generate representations of the sensor data and the correspondences can be identified with respect to the representations (e.g., a set of LIDAR data may be able to be matched to the corner of a building that has already been mapped within the geodetic datum).

As another example implementation, determining the set of correspondences can be accomplished using a machine learning model (e.g., a neural network.) For example, determining the similarity between two or more images can be accomplished using a classifier configured to output a confidence that two images display the same area. Additionally, since the reference dataset and the second dataset may include different sensor modalities, multiple machine-learning or data processing techniques may be used to improve accuracy for determining the set of correspondences.

As another example, determining the set of correspondences can include: determining, by the one or more computing device, a locus, processing imagery included in the referenced dataset associated with the locus to create a plurality of reference shards, processing imagery included the second dataset associated with the locus to create a plurality of second shards, and calculating an alignment based at least in part by comparing at least one reference shard to at least one second shard. In some implementations, calculating the alignment can include: selecting an aspect of one reference shard and triangulating the aspect to one or more of the second shards.

Another aspect of the disclosure includes calculating a transform field based in part on the set of correspondences. In general, the transform field can be used to assign datum coordinates to the regions represented in the second dataset. The transform field can be computed using various techniques such as mesh-to-mesh via an iterative closest point algorithm, image-to-image transformation, optical flow techniques, and/or other techniques (e.g., averaging or locally averaging the distances between various correspondences).

As used herein, the assigned datum coordinates determined using the transform field are referred to as transform coordinates. In some implementations, the transform field can be applied to assign transform coordinates to all regions included in the second dataset. In certain implementations, the transform field may only be applied to assign transform coordinates to some regions included in the second dataset. For instance, the transform field may include an accuracy of prediction, such that the transform field is more accurate over certain regions of the second dataset (e.g., regions within 15 ft. of a correspondence in the set of correspondences.) Based in part on the accuracy of prediction or another metric, the transform field may assign coordinates to only certain regions in the second dataset.

Another aspect of the disclosure includes updating the set of datum coordinates to include at least some of the transform coordinates (e.g., the coordinates assigned to the second set of sensor data through application of the transform field).

Repeating that process for datasets that collectively cover the entire Earth can be used to create a worldwide geodetic datum. Versioning and updates of the reference dataset (e.g., the datum coordinates associated with the reference dataset) can lead to the reference dataset changing over time. For example, new coverage can be added to expand the reference dataset. Additionally or alternatively, updated sensor information can be captured by new or existing devices to refine the reference dataset. To incorporate these changes into the geodetic datum, an immutable snapshot of the reference dataset can be created that can be associated with an identifier (e.g., name, time, etc.). Thus, at certain points, an entirely new datum or version of the geodetic datum can be generated and referenced to an immutable reference dataset, which can be referred to as an epoch.

The geodetic datum coordinates can be associated with the epoch and/or a snapshot of the reference dataset, and users may access the epochs and/or create transformations to project between snapshots through an API. As an example implementation, a user device may access information associated with the geodetic datum using the API to provide location information relative to the user device. Thus, systems can be implemented that access the geodetic datum for applications such as augmented reality (AR) which can provide advantages for AR applications that require a high degree of local accuracy. Additionally, localized applications such as grocery stores or airports may develop datasets that can be combined with a referenced dataset to create datum coordinates for large interior spaces that may also be referenced to an API snapshot that can be used for guidance by a customer and/or for automated restocking.

In addition to accessing location or navigation information, users may project coordinates between epochs (e.g., to develop time-representations of surface varying features.) As an example implementation, projecting between epochs can include performing similar operations as methods for generating a geodetic datum according to the present disclosure. For instance, since each epoch is associated with an immutable snapshot of the reference dataset. To project between two epochs, a user can designate one epoch as a reference epoch and another epoch as the second epoch. The reference dataset associated with the reference epoch can then be aligned with the reference dataset associated with the second epoch to determine correspondences that can be used in part to create a transform field for assigning transform coordinates to the reference dataset associated with the second epoch. In this manner, the datum coordinates generated using for a certain epoch can be projected to a another epoch For some AR applications, methods and systems of the disclosure may be configured to process real time data. For example, video captured by a user device can be obtained for use as the second dataset or included in the second dataset to provide local sensor information that can be used to generate datum coordinates in substantially real time. AR information such as an image layer may then be displayed on the user device and updated in real time as video is recorded of new areas or locations.

For implementations of the disclosure, the geodetic datum can demonstrate a high degree of relative accuracy. For example, certain implementations may demonstrate a relative accuracy of about 0.5 cm to about 10 cm per 300 m in all directions. Thus, for each point within the datum, the locations and/or objects within a sphere having a 300 m radius from each point are within about 0.5 cm to about 10 cm (e.g., about 1 cm) of their absolute distance. In some implementations, the datum coordinates are not fixed but may be periodically updated as new sensor data becomes available, allowing the datum coordinates to "float" or otherwise morph over time, similar to changes in relative locations experienced by various points on the Earth's surface due to various natural geological effects. An aspect of the floating coordinates can also include focusing updating the datum coordinates to a specific region, such as an area that has just experienced a natural disaster (e.g., an earthquake.)

As an example technical effect, the embodiments disclosed herein can allow the development of geodetic datums that are not tied to geometric approximations of the Earth. By leveraging some initial coordinate information, a geodetic datum can be constructed from sensor information that can demonstrate a high degree of relative accuracy. Using this high relative accuracy information can allow for advancements in localized information that is not easy to capture in standard datums such as building interior information that can be used for AR applications or to improve business procedures. Alternatively, shifting landscapes in areas such as cities, or those experiencing changes due to natural causes, may be more readily captured using methods according to the disclosure as this information can be incorporated into the datum in real time as changes occur. Construction of new buildings, for example, can lead to new data for inclusion in the reference dataset which can in turn improve the accuracy with which the geodetic datum can be determined. Furthermore, the ability to update the reference dataset ensures that accuracy of the geodetic datum as a whole can be preserved over time, through updating only a dataset, i.e. the reference dataset, which could be significantly smaller in geographical coverage than the area to be covered by the geodetic datum, leading to an improvement in the technical efficiency of the update process.

With reference now to the Figures, example embodiments of the present disclosure will be discussed in further detail.

Example Devices and Systems

FIG. 1A depicts a block diagram of an example computing system 100 for generating a geodetic datum according to example embodiments of the present disclosure. The system 100 can include a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more alignment models 120. For example, the alignment models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

Additionally or alternatively, the alignment models are not necessarily learned models but instead can perform various feature matching algorithms such as structure from motion, image comparison, feature mapping, etc. to identify areas of overlap between the reference dataset and the additional sensor data (e.g., included in the second dataset). In some implementations, calculating the alignment can include identifying a locus representing a general area of overlap between certain data included in the reference dataset and certain data in the second dataset. Attributes of data within the locus can be decomposed into one or more shards that define a lower representation of the data (e.g., a portion of an image, a black and white representation of an image, a smooth surface representation of an image such as a shape representation, or combinations thereof.) In some implementations, calculating an alignment can be based at least in part by comparing at least one reference shard (determined from data included in the reference dataset) to at least one second shard (determined from data included in the second dataset). For example, an aspect of one reference shard can be selected and triangulated to one or more of the second shards. This process can be repeated for each of the data points included in the second dataset to and the triangulated alignment may be smoothed to account for slight variations in pose or sensor data. As another example, at every shard a rigid transform can be computed to generate a set of points and interpolation can be performed by triangulating between each of the points over the entire dataset.

In some implementations, the one or more alignment models 120 can be received from the server computing system 130 over network 180, stored in the user computing device memory 114, and then used or otherwise implemented by the one or more processors 112. In some implementations, the user computing device 102 can implement multiple parallel instances of a single alignment model 120 (e.g., to determine correspondences between the reference dataset and the second dataset in parallel.) These use cases may provide advantages when more than one second dataset is available or if the second dataset is large (e.g., based on the number of examples included in the second dataset in comparison to examples included in the reference dataset) and correspondence mapping between datasets can be more efficiently processed by segmenting the second dataset.

More particularly, the alignment model 120 can function to determine a set of correspondences between a reference dataset obtained by the computing system 130 and a second dataset obtained by the computing system 130. As an example, correspondences can be identified using various image feature matching techniques, iterative closest point algorithms, and/or the like. In some implementations, correspondences can be identified between raw sensor data included as part of the reference dataset and/or the second dataset. In other implementations, various pre-processing techniques such as bird's eye view representations, three-dimensional modeling (e.g., mesh models), and/or the like can be used to generate representations of the sensor data and the correspondences can be identified with respect to the representations.

In certain implementations, the set of correspondences can be used in part to calculate a transform field which can be used to assign or otherwise determine transform coordinates for the second dataset to generate a continuous coordinate representation of the portion of Earth represented in the reference dataset and second dataset. The coordinates defining this continuous representation can be used as the geodetic datum. An aspect of the alignment model 120 can include iterating over additional second datasets (e.g., a third dataset, a forth dataset, etc.) to continue determining correspondences which can be used to update or otherwise extend the geodetic datum to represent additional portions of Earth.

Additionally or alternatively, one or more alignment models 140 can be included in or otherwise stored and implemented by the server computing system 130 that communicates with the user computing device 102 according to a client-server relationship. For example, the alignment model(s) 140 can be implemented by the server computing system 130 as a portion of a web service. Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned alignment models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks.

The user computing device 102 and/or the server computing system 130 can train the models 120 and/or 140 via interaction with the alignment computing system 150 that is communicatively coupled over the network 180. The training computing system 150 can be separate from the server computing system 130 or can be a portion of the server computing system 130.

The training computing system 150 can include one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the alignment models 120 and/or 140 based on a set of training data 162. The training data 162 can include, for example, portions of aerial images such as satellite or camera images that can include color, light, or other data aspects as well as ground level images such as photographs and/or video. In some implementations, the model trainer may not be used or otherwise included as part of the computing system. For example, in some implementations the alignment model may use one or more unsupervised learning techniques to determine the set of correspondences.

In certain implementations, if the user has provided consent, the training examples and/or data for inclusion in the second dataset can be provided by the user computing device 102. Thus, in such implementations, the alignment model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general-purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
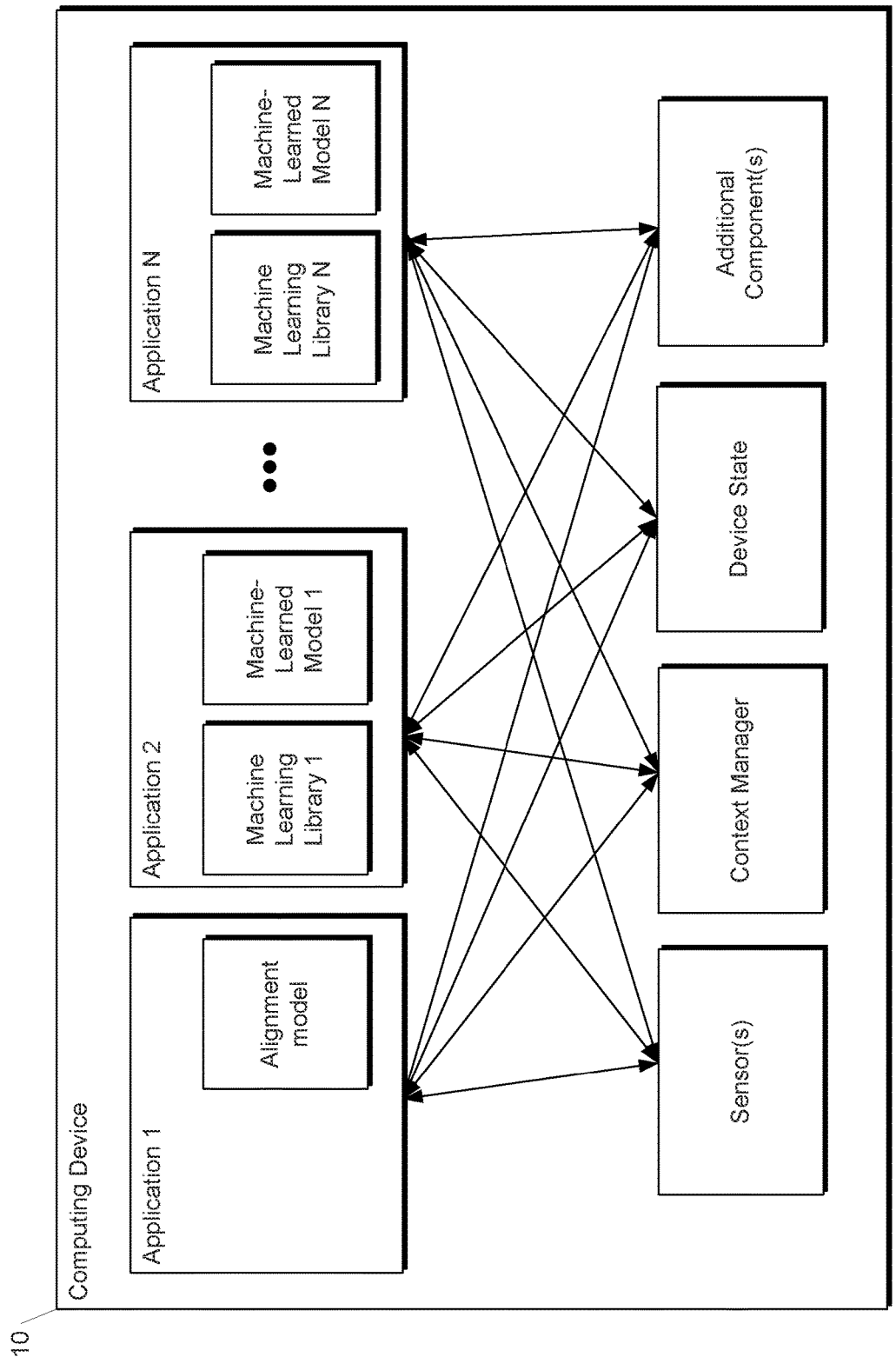
FIG. 1B depicts a block diagram of an example computing device for generating a geodetic datum according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application can contain its own machine learning library and machine-learned model(s). For example, each application can include a machine-learned model. Example applications include a text messaging application, an email application, an augmented reality application, a camera application, a GPS application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application. For example, an augmented reality (AR) application may include an API for communicating with the alignment model and/or an output of the alignment model such as the geodetic datum.

Figure 1C:
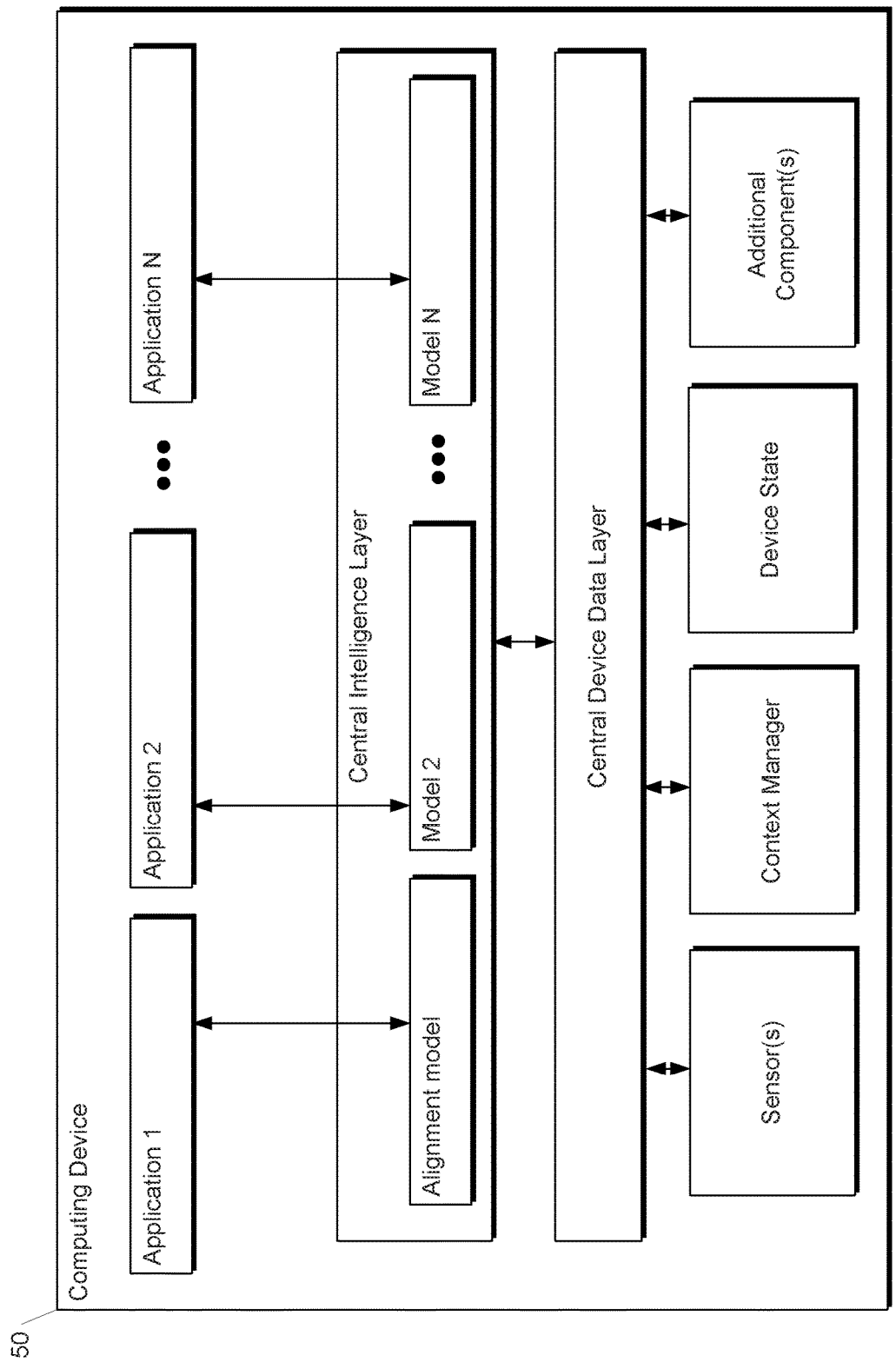
FIG. 1C depicts a block diagram of an example computing device for generating a geodetic datum according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, an augmented reality application, a camera application, a GPS application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
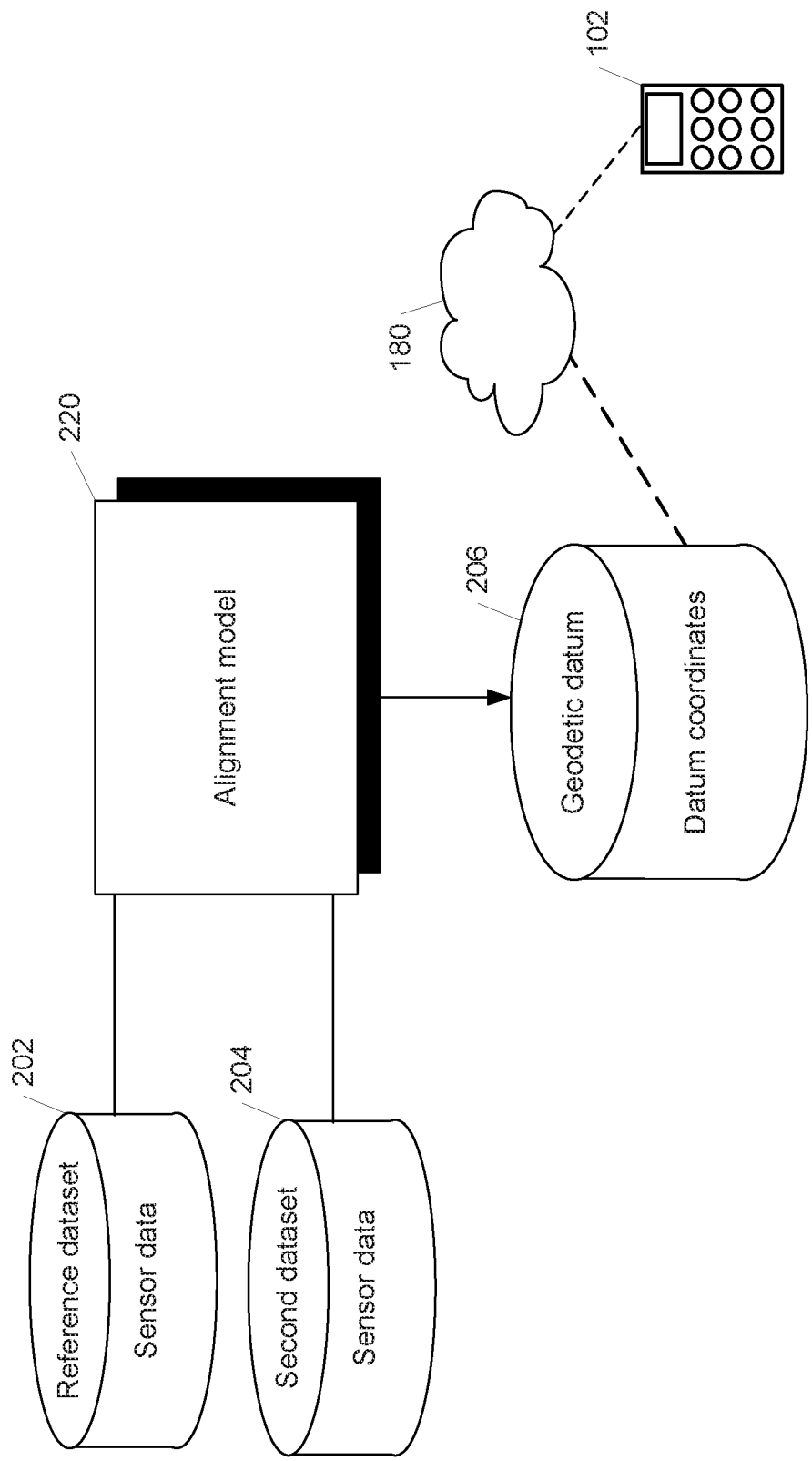
FIG. 2 depicts a block diagram of an example method for generating a geodetic datum according to example embodiments of the present disclosure.

FIG. 2 depicts a block diagram of an example alignment model 220 according to example embodiments of the present disclosure. In some implementations, the alignment model 220 can be trained or otherwise configured to receive a reference dataset 202 and second dataset 204 each including information representative of a portion of Earth or another continuous region. As a result of receipt of the reference dataset 202 and second dataset 204, the alignment model 220 can provide output data such as a set of correspondences that can then be used to determine datum coordinates for updating the geodetic datum 206. In certain implementations, a user device 102 can access the geodetic datum 206 through a communications network 180 to access or otherwise receive positional information for use in applications on the user device 102 such as augmented reality applications, mapping applications, etc.

Example Methods

Figure 3:
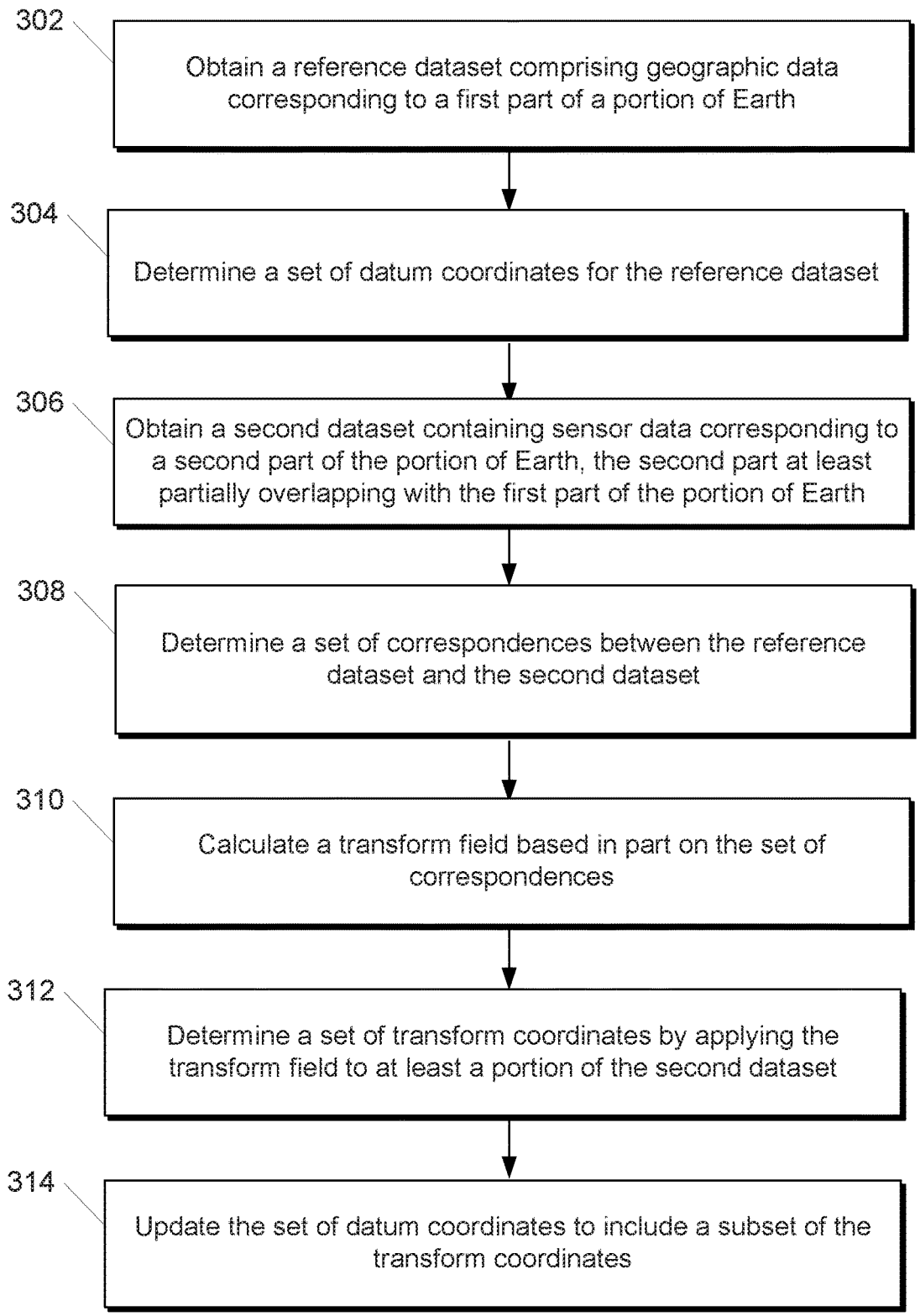
FIG. 3 depicts a flow chart diagram of an example method for generating a geodetic datum according to example embodiments of the present disclosure.

FIG. 3 depicts a flow chart diagram of an example method to perform according to example embodiments of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, a computing system may obtain a reference dataset comprising geographic data corresponding to a first part of a portion of Earth. In certain implementations, the reference dataset can include a variety of sensor information such as aerial imagery including video, or photographs captured by an airborne vehicle (e.g., a drone, satellite, airplane, etc.) Obtaining the reference dataset can include accessing libraries of stored data, generating new sensor data, and/or updating or otherwise modifying existing data (e.g., stored data).

At 304 the computing system may determine a set of datum coordinates for the reference dataset. In some implementations, the set of datum coordinates may be obtained from an existing set of datum coordinates (e.g., WGS coordinates) as measuring using a sensor such as a GPS device. Alternatively, the set of datum coordinates may be defined by manual or automated labeling of the sensor data that can be determined in part using associated sensor information (e.g., flight speed, barometric pressure, flight direction, etc.)

At 306, the computing system may obtain a second dataset containing sensor data corresponding to a second part of the portion of Earth, the second part at least partially overlapping with the first part of the portion of Earth. For implementations of the disclosure, the second dataset can include sensor data from a different modality or the same modality as the sensor data included in the reference dataset. As an example, the sensor data included in the second dataset can include ground level images obtained from one or more people. In contrast, the sensor data included in the reference dataset can include three-dimensional aerial images. As another example, the reference dataset and the second dataset can both include the same type of sensor data. In general, at least a portion of the sensor data included in the reference dataset and the second dataset should correspond to the same portion of Earth. For example, aerial images of Los Angeles California (LA) and the surrounding suburbs may be included in an example reference dataset and an example second dataset may include ground level images of the LA suburbs extending to surrounding areas such as Huntington Beach California.

At 308, the computing system may determine a set of correspondences between the reference dataset and the second dataset. In some implementations, determining the set of correspondences can include using a machine learning model to identify similar features in each of the datasets. In an example implementation, the machine learning model can be configured as a supervised model that can be trained using a training dataset. Alternatively, the machine learning model can be configured as an unsupervised model. In general, determining the set of correspondences can include providing the reference dataset and the second dataset to one or more machine learning models that can each independently be unsupervised or supervised models. In an example implementation, two self-consistent models can be used in parallel to shard the area represented in the reference dataset and the second dataset into a lower data representation (e.g., into bits). The lower data representation can then be aligned based on identifying one or more correspondences. Example correspondences can include, color, shape, background, and/or other features of the sensor data.

At 310, the computing system may calculate a transform field based in part on the set of correspondences. The transform field can be computed using various techniques such as mesh-to-mesh via an iterative closest point algorithm, image-to-image transformation, optical flow techniques, and/or other techniques (e.g., averaging or locally averaging the distances between various correspondences).

At 312, the computing system may determine a set of transform coordinates by applying the transform field to at least a portion of the second dataset. In general, the transform field can be used to map points between the reference dataset and the second dataset such as by assigning similar (e.g., the same) datum coordinates obtained for the referenced dataset to regions of overlap in the second dataset and using regression or another technique to extrapolate other areas represented in the second dataset to generate a continuous representation of the geographic regions represented in both the reference dataset and the second dataset. As an example, each of the correspondences over the area represented in each dataset can be combined into a map of points representing the area. These points can be triangulated and optionally smoothed (e.g., using an averaging algorithm) to develop a transform field that can be extended to other data included in the second dataset.

At 314, the computing system may update the set of datum coordinates to include a subset of the transform coordinates. In an example implementation, to extend the geodetic datum to incorporate the region shown in the second dataset, the set of datum coordinates can be updated to include the transform coordinates assigned to the geographic region represented in the second dataset. Repeating this process for datasets (e.g., second datasets) that collectively cover the entire Earth can be used to create a geodetic datum of the entire Earth, without the need for a mathematic abstraction of the Earth surface.

Example Datum Configuration

Figure 4:
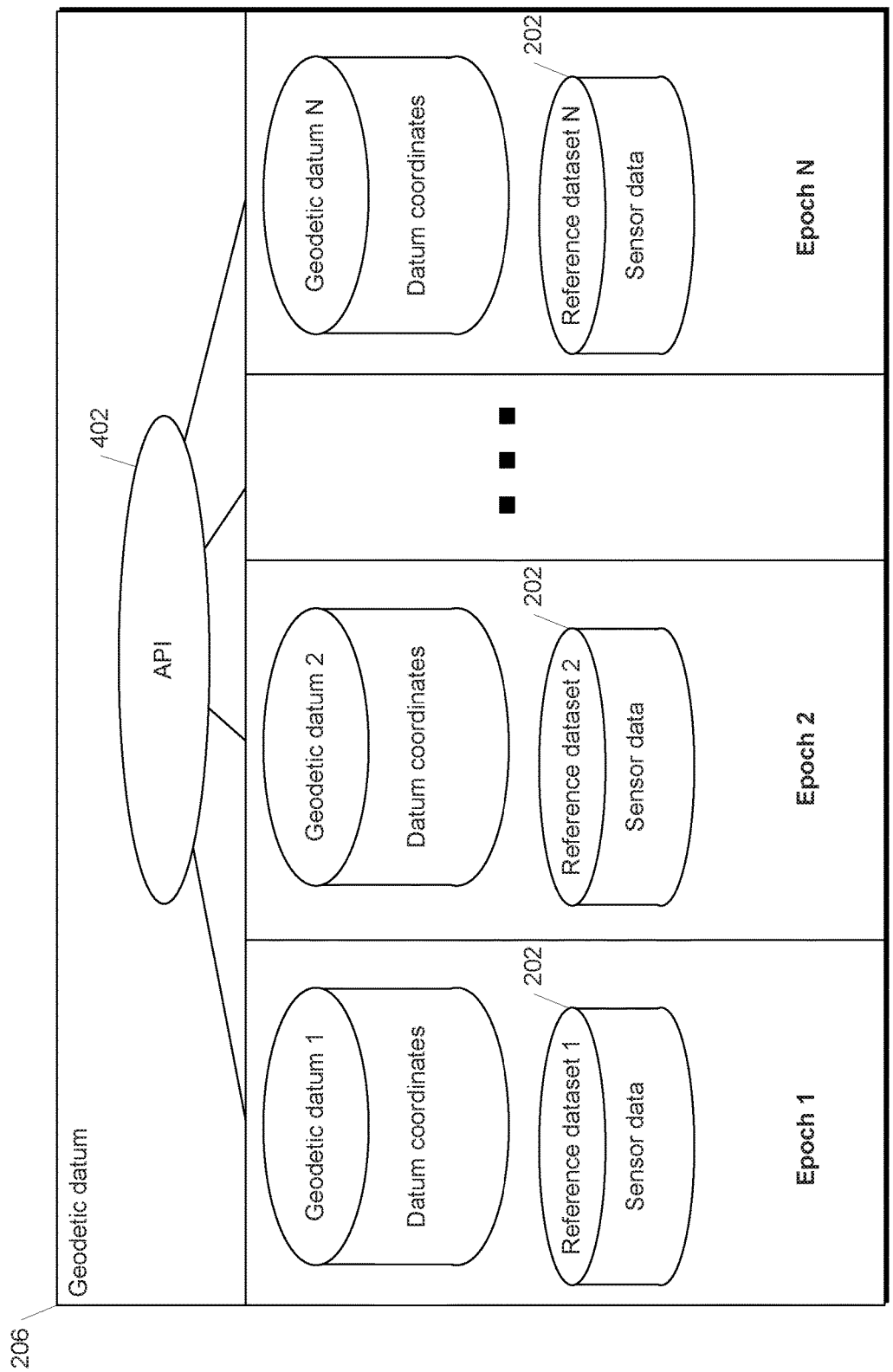
FIG. 4 depicts a block diagram of an example geodetic datum generated in accordance with example embodiments of the present disclosure.

FIG. 4 depicts a block diagram of an example geodetic datum configuration according to example embodiments of the disclosure. Although FIG. 4 depicts the geodetic datum 206 as including one or more instances of geodetic datums generated in accordance with embodiments of the disclosure (e.g., geodetic datum 1, 2, . . . , N), it should be understood that these instances or snapshots may be separately stored rather than included in a single geodetic datum. Nonetheless, whether stored separately or as part of a single datum, an API 402 can be configured to provide access to the one or more instances of geodetic datums which each can be associated with a static reference dataset 202. Thus, as new sensor data and/or updated sensor data leads to changes in the reference dataset 202, a new version or epoch of the geodetic datum can be created and stored separately on various computing devices or on a single computing device.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for generating a geodetic datum for a portion of Earth, the method comprising:
    obtaining, by one or more computing devices comprising one or more processors, a set of datum coordinates derived from a reference dataset comprising geographic data corresponding to a first part of the portion of the Earth;
    obtaining, by the one or more computing devices, a second dataset containing sensor data corresponding to a second part of the portion of the Earth, wherein the second part of the portion of the Earth at least partially overlaps with the first part of the portion of the Earth;
    determining, by the one or more computing devices, based on inputting the reference dataset and the second dataset into one or more machine-learned alignment models, a set of correspondences between the reference dataset and the second dataset, wherein the set of correspondences comprise spatial features of the reference dataset that correspond to spatial features of the second dataset;
    determining, by the one or more computing devices, based on mapping the spatial features of the reference dataset to the spatial features of the second dataset, a set of transform coordinates for the second dataset based at least in part on the set of correspondences; and
    updating, by the one or more computing devices, the set of datum coordinates to include the set of transform coordinates, wherein the updating comprises modifying the set of datum coordinates to include the transform coordinates.

2. The computer-implemented method of claim 1, wherein determining, by the one or more computing devices, a set of transform coordinates for the second dataset based at least in part on the set of correspondences comprises:
    calculating, by the one or more computing devices, a transform field based in part on the set of correspondences; and
    determining, by the one or more computing devices, the set of transform coordinates for the second dataset by applying the transform field to at least a portion of the second dataset.

3. The computer-implemented method of claim 1, wherein the reference dataset and the second dataset respectively comprise sensor data from at least two different sensor modalities.

4. The computer-implemented method of claim 1, wherein the reference dataset includes three-dimensional satellite imagery, aerial imagery, or both, and the second dataset includes ground-level imagery.

5. The computer-implemented method of claim 1, further comprising updating, by the one or more computing devices, the reference dataset to include a subset of points in the second dataset that have been mapped using a transform field.

6. The computer-implemented method of claim 1, further comprising creating, by the one or more computing devices, a snapshot, wherein the snapshot includes a time-referenced representation of the geodetic datum.

7. The computer-implemented method of claim 1, wherein determining, by the one or more computing devices, a set of correspondences comprises:
    determining, by the one or more computing device, a locus;
    processing, by the one or more computing devices, imagery included in the reference dataset associated with the locus to create a plurality of reference shards;
    processing, by the one or more computing devices, imagery included the second dataset associated with the locus to create a plurality of second shards; and
    calculating, by the one or more computing devices, an alignment based at least in part by comparing at least one reference shard to at least one second shard.

8. The computer-implemented method of claim 7, wherein calculating, by the one or more computing devices, the alignment comprises:
    selecting, by the one or more computing devices, an aspect of one reference shard; and
    triangulating, by the one or more computing devices, the aspect to one or more of the second shards.

9. The computer-implemented method of claim 1, wherein the geodetic datum demonstrates a relative accuracy of about 0.5 cm to about 10 cm per 300 m in all directions.

10. The computer-implemented method of claim 1, wherein the sensor data comprises one or more of: colored images, video, and light detection and ranging data.

11. The computer-implemented method of claim 1, further comprising transmitting a data packet including information from the geodetic datum to a user device.

12. The computer-implemented method of claim 11, wherein the information included in the data packet comprises geolocalized feature data usable to determine a location of the user device relative to the geolocalized feature data.

13. The computer-implemented method of claim 12, wherein the user device is configured to display an augmented reality layer based in part on the data packet.

14. The computer-implemented method of claim 11, wherein the information included in the data packet comprises position information that assigns a reference position to the user device and a relative position for objects within a radius from the reference position.

15. A computing system configured to generate a geodetic datum for a portion of Earth, the computing system comprising:
    one or more processors;
    one or more non-transitory computer-readable media that collectively store instructions that, when executed by the one or more processors cause the computing system to perform operations, the operations comprising:
        obtaining a set of datum coordinates derived from a reference dataset comprising geographic data corresponding to a first part of the portion of the Earth;
        obtaining a second dataset containing sensor data corresponding to a second part of the portion of the Earth, wherein the second part of the portion of the Earth at least partially overlaps with the first part of the portion of the Earth;

determining, based on inputting the reference dataset and the second dataset into one or more machine-learned alignment models, a set of correspondences between the reference dataset and the second dataset, wherein the set of correspondences comprise spatial features of the reference dataset that correspond to spatial features of the second dataset;

determining, based on mapping the spatial features of the reference dataset to the spatial features of the second dataset, a set of transform coordinates for the second dataset based at least in part on the set of correspondences; and updating the set of datum coordinates to include the set of transform coordinates, wherein the updating comprises modifying the set of datum coordinates to include the transform coordinates.

16. One or more tangible non-transitory computer-readable media storing computer-readable instructions that when executed by one or more processors cause the one or more processors to perform operations, the operations comprising:

obtaining a set of datum coordinates derived from a reference dataset comprising geographic data corresponding to a first part of a portion of Earth;

obtaining a second dataset containing sensor data corresponding to a second part of the portion of the Earth, wherein the second part of the portion of the Earth at least partially overlaps with the first part of the portion of the Earth;

determining, based on inputting the reference dataset and the second dataset into one or more machine-learned alignment models, a set of correspondences between the reference dataset and the second dataset, wherein the set of correspondences comprise spatial features of the reference dataset that correspond to spatial features of the second dataset;

determining, based on mapping the spatial features of the reference dataset to the spatial features of the second dataset, a set of transform coordinates for the second dataset based at least in part on the set of correspondences; and updating the set of datum coordinates to include the set of transform coordinates, wherein the updating comprises modifying the set of datum coordinates to include the transform coordinates.

17. The one or more tangible non-transitory computer-readable media of claim 16, wherein determining a set of transform coordinates for the second dataset based at least in part on the set of correspondences comprises:

calculating a transform field based in part on the set of correspondences; and determining the set of transform coordinates for the second dataset by applying the transform field to at least a portion of the second dataset.

18. The one or more tangible non-transitory computer-readable media of claim 16, wherein the reference dataset and the second dataset respectively comprise sensor data from at least two different sensor modalities.

19. The one or more tangible non-transitory computer-readable media of claim 16, wherein the reference dataset includes three-dimensional satellite imagery, aerial imagery, or both, and the second dataset includes ground-level imagery.

20. The one or more tangible non-transitory computer-readable media of claim 16, further comprising updating the reference dataset to include a subset of points in the second dataset that have been mapped using a transform field.

* * * * *